United States Patent [19]

Furusawa

[11] Patent Number: 5,327,259
[45] Date of Patent: Jul. 5, 1994

[54] IMAGE PROCESSING SYSTEM AND IMAGE PROCESSING METHOD

[75] Inventor: Katsuhiko Furusawa, Kyoto, Japan

[73] Assignee: Dainippon Screen Mfg. Co., Ltd., Kyoto, Japan

[21] Appl. No.: 805,742

[22] Filed: Dec. 12, 1991

[30] Foreign Application Priority Data

Dec. 21, 1990 [JP] Japan ................... 2-401456

[51] Int. Cl.5 .................................... H04N 1/40
[52] U.S. Cl. ....................... 358/448; 358/444; 358/474; 358/487
[58] Field of Search ............... 358/448, 487, 498, 488, 358/474, 471, 444, 443, 332, 345; 355/40, 38, 75; 354/105, 106, 76

[56] References Cited

U.S. PATENT DOCUMENTS

| | | | |
|---|---|---|---|
| 4,283,621 | 8/1981 | Pembroke | 355/64 |
| 4,494,862 | 1/1985 | Tanaka | 355/40 |
| 4,637,712 | 1/1987 | Arnold et al. | 355/75 |
| 4,640,612 | 2/1987 | Watanabe et al. | 355/95 |
| 4,870,504 | 9/1989 | Ishida et al. | 358/474 |
| 4,996,605 | 2/1991 | Taniguchi et al. | 358/474 |
| 5,073,829 | 12/1991 | Katsuta et al. | 358/498 |

FOREIGN PATENT DOCUMENTS 62-243477 10/1987 Japan.

Primary Examiner—Stephen Brinich
Assistant Examiner—Fan Lee
Attorney, Agent, or Firm—Lowe, Price, LeBlanc & Becker

[57] ABSTRACT

An image processing system includes a plurality of document holders for supporting original documents and having identification data, a setup apparatus for determining setup conditions relating to the original documents, and an image processing apparatus for processing an original image on determined setup conditions. The setup apparatus and image processing apparatus are interconnected through a communication line for transferring the setup conditions determined by the setup apparatus to the image processing apparatus. The image processing apparatus selects the setup conditions corresponding to the identification data, from the setup conditions transferred from the setup apparatus.

25 Claims, 16 Drawing Sheets

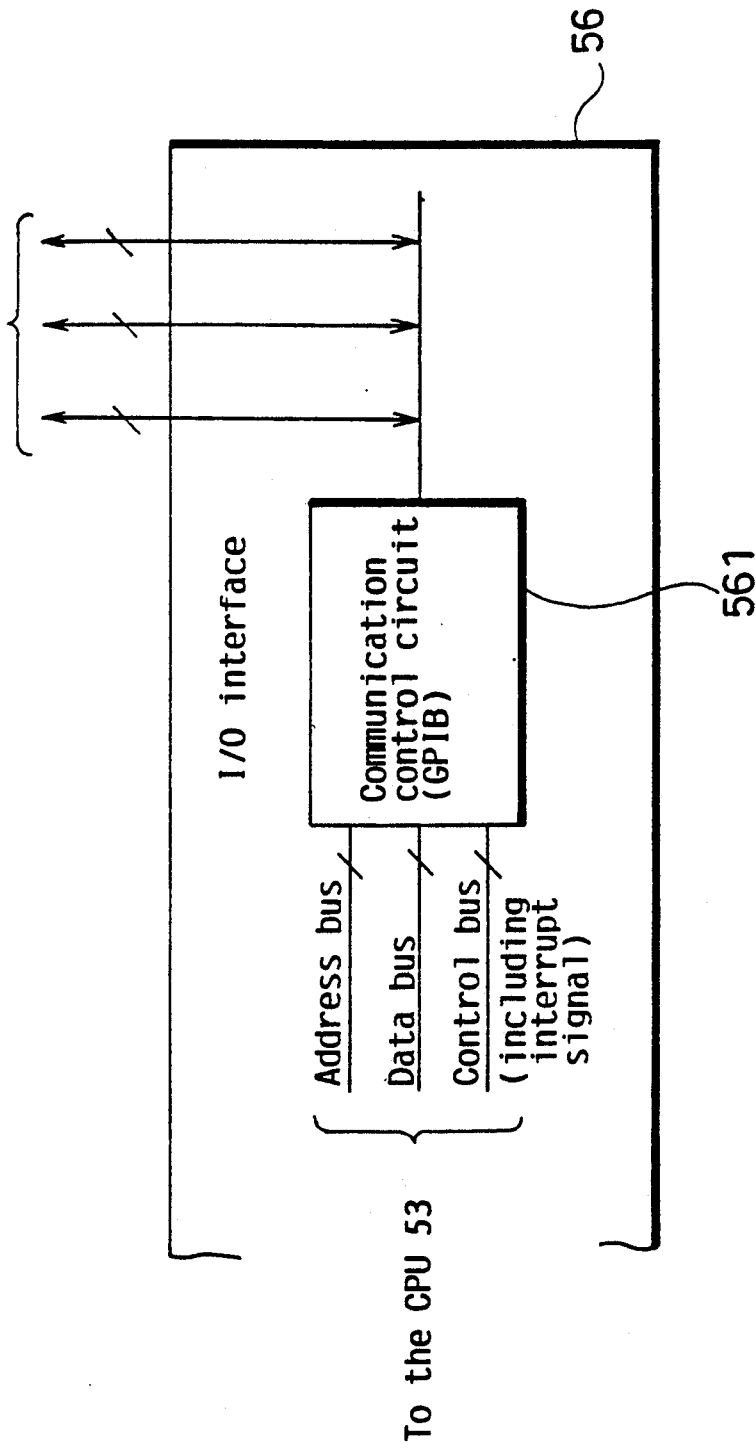

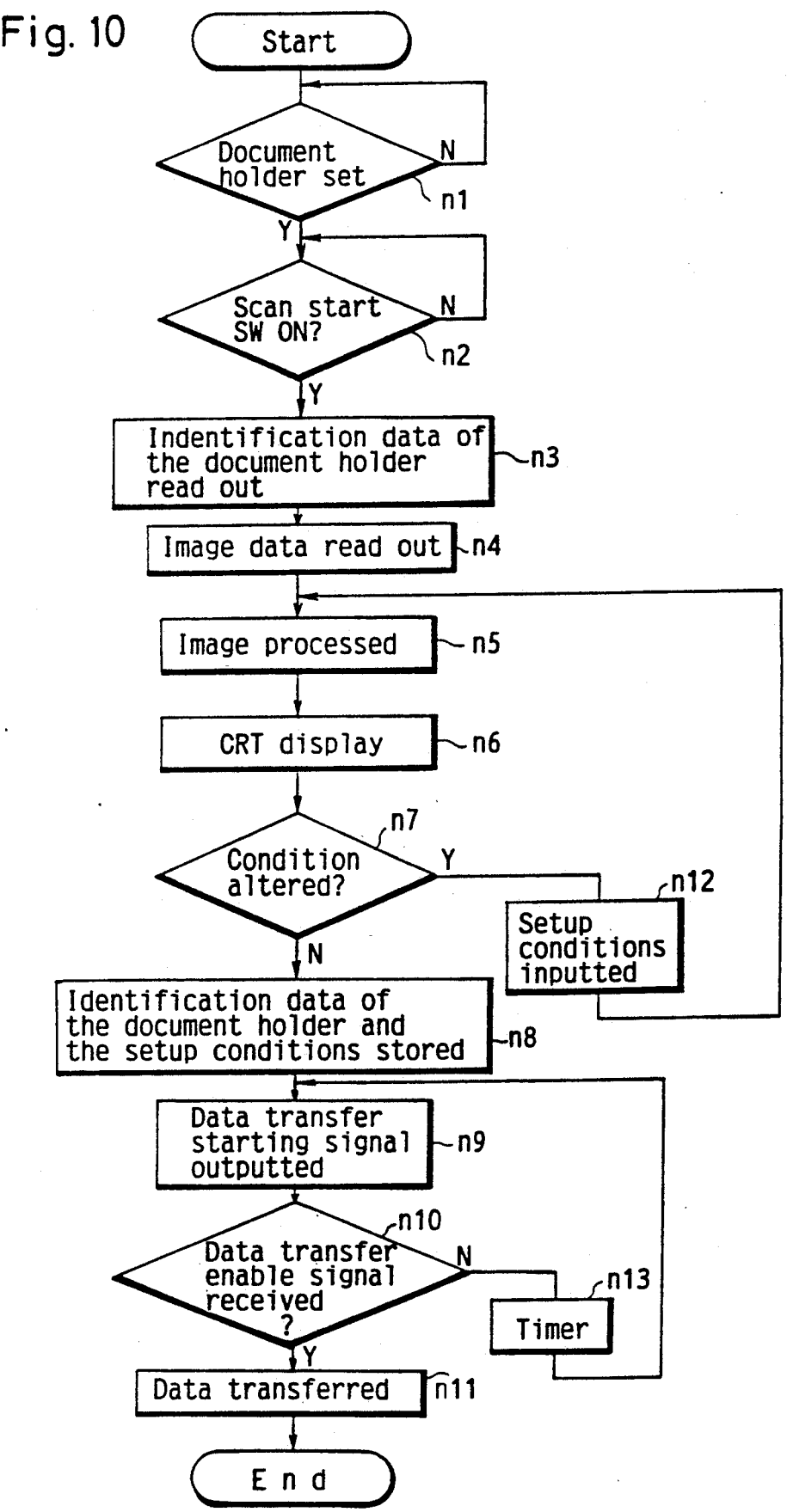

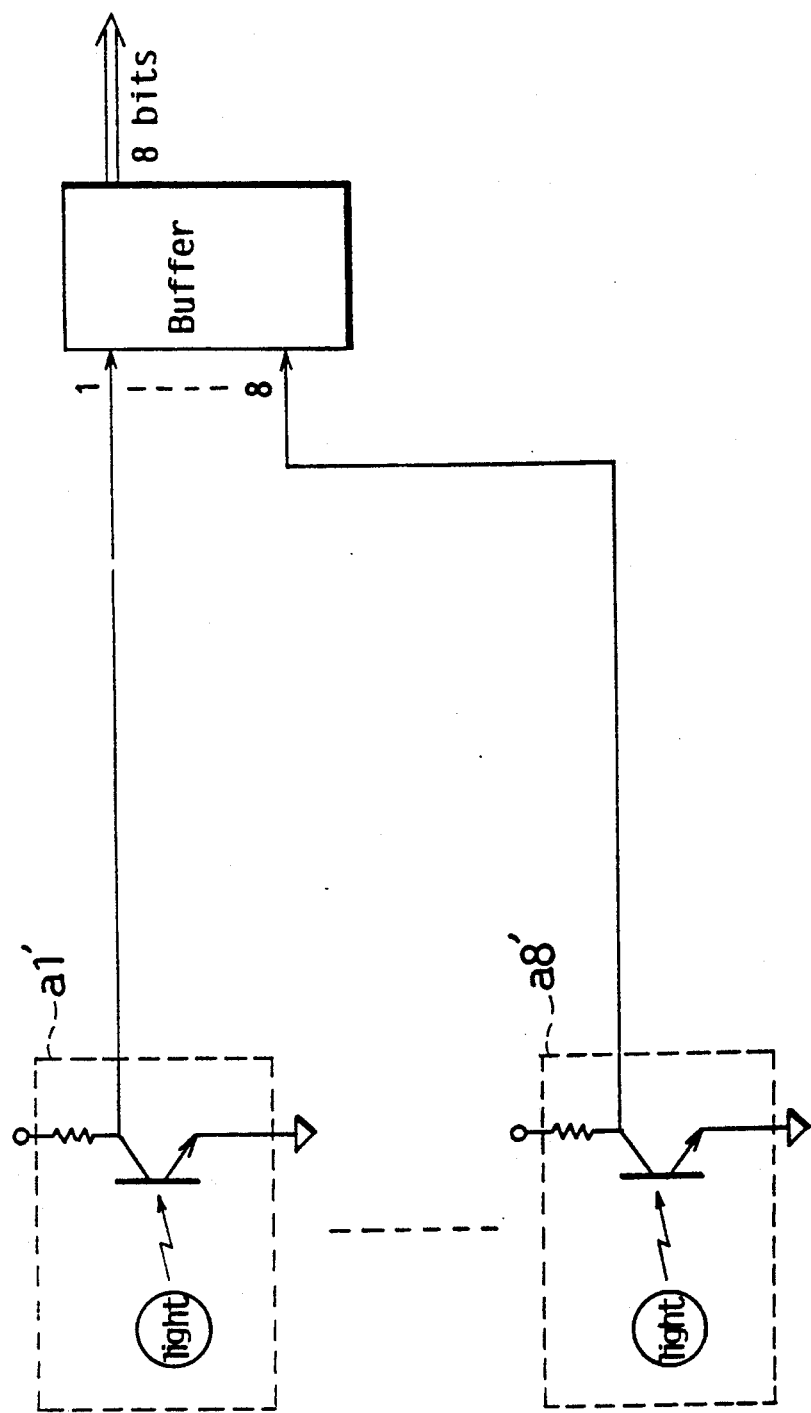

IMAGE PROCESSING SYSTEM AND IMAGE PROCESSING METHOD

BACKGROUND OF THE INVENTION (1) Field of the Invention

This invention relates to an image processing system and image processing method for processing images on setup conditions, the system including an image processing apparatus such as a prepress scanner, and a setup apparatus or apparatuses for setting the setup conditions.

(2) Description of the Related Art

In scanning and reading an original document with an image processing apparatus such as a prepress scanner, setup conditions regarding significant parts of the original, e.g. highlight points, shadow points and tone curves, are set in advance in order to reproduce the original image in a desired state.

However, the original cannot be scanned to read information therefrom during an operation to set the setup conditions to the image processing apparatus. This results in a low operation rate of the image processing apparatus, impairing efficiency of image processing.

In order to improve the operation rate of the image processing apparatus, a setup apparatus has been developed for determining setup conditions in a separate process. The setup conditions determined with this type of apparatus are manually written on a special sheet of tables categorically listing the setup conditions, printed on computer printout paper, or stored in a magnetic storage such as a magnetic disk. The setup conditions recorded in this way are taken along with the original to the image processing apparatus. Then, the setup conditions are set to the image processing apparatus by manually operating a dial or keys of the image processing apparatus or by causing the image processing apparatus to read data from the magnetic storage, which is followed by scanning of the original.

On the other hand, Japanese Patent Publication Laying-Open No. 1987-243477 discloses a scanner which reads identification data from a document holder, reads setup data corresponding to the identification data from a magnetic disk, and carries out image processing.

The setup apparatus has heretofore been used in the above mode, in which the setup conditions determined are recorded on paper or a magnetic storage such as a magnetic disk, and handled with the original as a set. However, this use mode involves the trouble of ensuring that the setup conditions and original are always kept together such as by filing them in a single vinyl case. Moreover, the conventional practice is inefficient in that, since the setup conditions are transferred to the scanner by means of a data recording medium in an "off-line" connection, time is lost in recording the conditions on the special sheet or changing the media.

Further, when two or more setup apparatuses are used in combination with an image processing apparatus and data are transferred off-line therebetween, a plurality of magnetic disks are used to store setup conditions and this requires an irksome operation to change the disks.

SUMMARY OF THE INVENTION

This invention has been made having regard to the state of the art noted above, and its object is to provide an image processing system which facilitates inputting of setup conditions and realizes an improved operation rate of the image processing apparatus.

The above object is fulfilled by an image processing system comprising a plurality of document holders for supporting original documents and having identification data; at least one setup apparatus for determining setup conditions relating to the original documents; an image processing apparatus for reading the identification data from a document holder set in position, and processing the original image on selected setup conditions; and a communication line for transferring the setup conditions determined by the setup apparatus to the image processing apparatus; wherein, upon reading the identification data, the image processing apparatus is set with the setup conditions transferred through the communication line and corresponding to the identification data read, for processing the original image on the setup conditions.

The identification data may be a data for discriminating the document holder to which the identification data is applied, from the other document holders.

When a plurality of setup apparatuses are included in the system, the identification data may be a data for discriminating the setup apparatus to which the identification data is set, from the other setup apparatuses. In this case, the document holders and setup apparatuses are in corresponding relations, respectively, and the original document of each document holder has the setup conditions thereof determined only by a corresponding one of the setup apparatuses.

Further, the setup apparatus or the image processing apparatus may include a memory for storing the setup conditions in relation to the identification data. This memory may store the setup conditions and the identification data in pairs. Alternatively, the memory may store the setup conditions in areas determined from the identification data.

With the system having the above construction, setup conditions are determined through the setup apparatus, and the image processing apparatus is able to process an image on the setup conditions thus determined. Such setup conditions are transmitted through the communication line without requiring manual handling. In this way, the system according to this invention facilitates inputting of the setup conditions, and improves the operation rate of the image processing apparatus.

This invention has for another object to provide an image processing system for processing images properly by avoiding mismatch among a plurality of original images and setup conditions.

This object is fulfilled by an image processing system comprising a plurality of document holders each for supporting an original document and having an identification data for discrimination from the other holders; at least one setup apparatus for determining setup conditions relating to the original documents, and including a reading device for reading the identification data from the document holders; an image processing apparatus for reading the identification data from a document holder set in position, and processing the original image on selected setup conditions; and a communication line for transferring the setup conditions determined by the setup apparatus to the image processing apparatus; wherein, upon reading the identification data, the image processing apparatus is set with the setup conditions transferred through the communication line and corresponding to the identification data read, for processing the original image on the setup conditions.

In the above system, two or more setup apparatuses connected to the image processing apparatus read the identification data from the document holders and determine setup conditions. The setup conditions are transmitted as related to the identification data to the image processing apparatus. The image processing apparatus reads an identification data from one of the document holders, and effects image processing on the setup conditions matching this identification data. This is effective to avoid a mismatch between the original image and setup conditions with no additional time and trouble required for this purpose.

The above object is fulfilled also by an image processing system comprising a plurality of document holders for supporting original documents and having setup apparatus identification data; a plurality of setup apparatuses for determining setup conditions relating to the original documents; an image processing apparatus for reading the identification data from a document holder set in position, and processing the original image on selected setup conditions; and a communication line interconnecting each of the setup apparatuses and the image processing apparatus for transferring the setup conditions determined by the setup apparatuses to the image processing apparatus; wherein, upon reading the identification data, the image processing apparatus is set with the setup conditions transferred through the communication line and corresponding to the identification data read, for processing the original image on the setup conditions.

In the above system, when each setup apparatus determines the setup conditions for the original document supported by the document holder set to the setup apparatus, these setup conditions are transferred as related to an identification data to the image processing apparatus. The image processing apparatus reads an identification data from a document holder, and effects image processing on the setup conditions corresponding to this identification data. Here, again, a mismatch between the original image and setup conditions is avoided with no additional time and trouble required therefor.

This invention has a further object to provide an image processing method for facilitating inputting of setup conditions and improving the operation rate of the image processing apparatus.

This object is fulfilled by an image processing method comprising the steps of setting one of document holders to a setup apparatus to determine setup conditions; outputting the setup conditions determined to a communication line as related to identification data; setting the one of the document holders to an image processing apparatus to read an identification data therefrom; setting to the image processing apparatus the setup conditions transferred through the communication line and corresponding to the identification data read by the image processing apparatus and causing the image processing apparatus to read an original image from the document holder set thereto and to process the image on the setup conditions also set thereto.

The above object is fulfilled also by an image processing method comprising the steps of setting one of document holders to one of setup apparatuses to determine setup conditions; outputting the setup conditions determined to a communication line as related to the one of the setup apparatuses; setting the one of the document holders to an image processing apparatus to read the identification data therefrom; setting to the image processing apparatus the setup conditions transmitted from the one of the setup apparatuses identified by the identification data read; and causing the image processing apparatus to read an original image from the document holder set thereto and to process the image on the setup conditions also set thereto.

According to these methods, setup conditions are determined through the setup apparatus, and the image processing apparatus is able to process an image on the setup conditions thus determined. Such setup conditions are transmitted through the communication line without requiring manual handling. In this way, inputting of the setup conditions is facilitated to realize an improved operation rate of the image processing apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 9 is a block diagram showing details of a portion of an I/O interface included in the image processing apparatus.

FIG. 10 is a flowchart showing a sequence of controlling the setup apparatus in the image processing system shown in FIG. 1.

FIG. 16 is a diagram showing detection circuits associated with the sensors shown in FIG. 15.

DESCRIPTION OF THE PREFERRED EMBODIMENTS

Embodiment I

Figure 1:
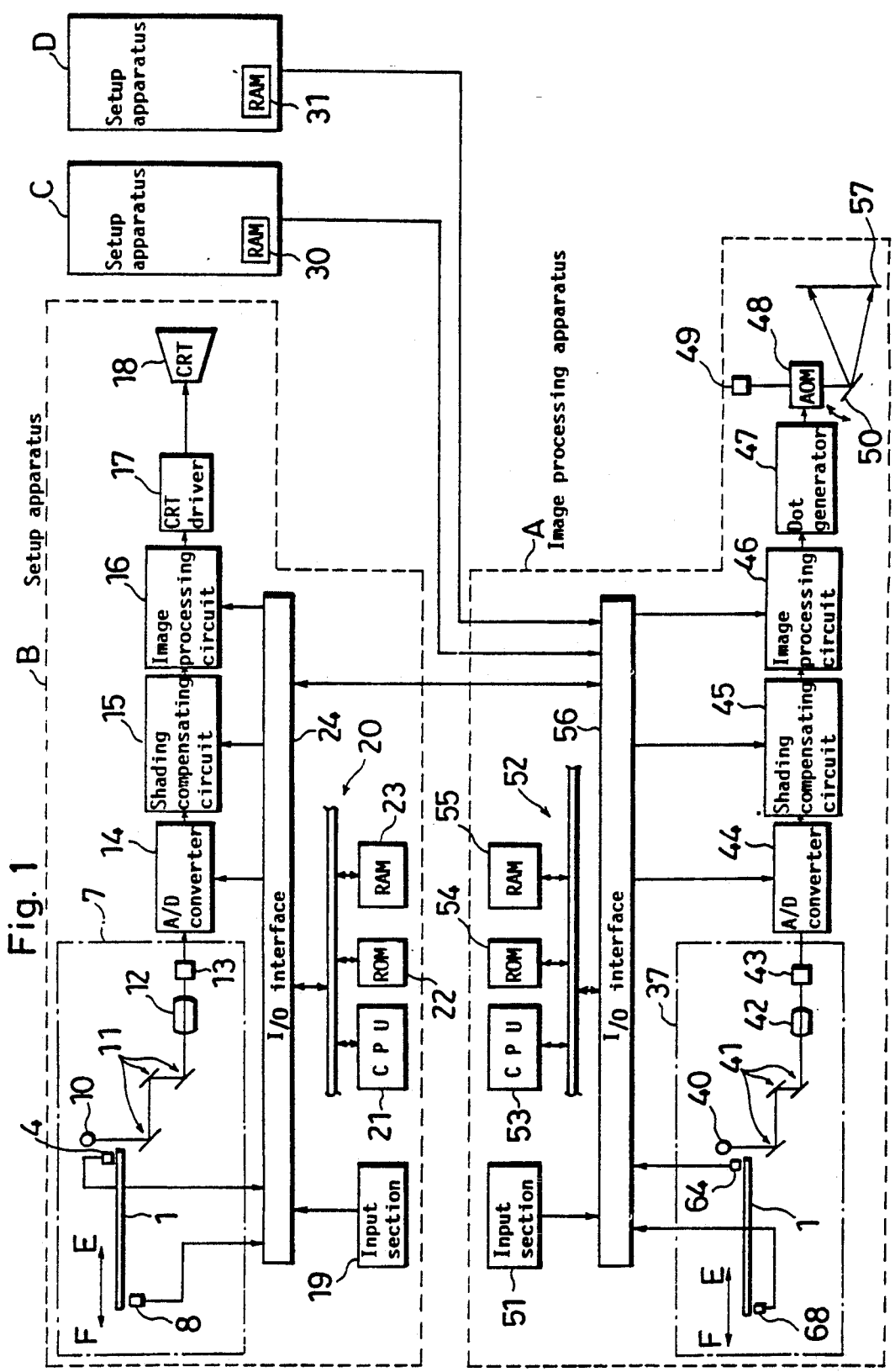
FIG. 1 is a block diagram of an image processing system in a first embodiment of this invention.

FIG. 1 is a block diagram of a first embodiment of this invention comprising an image processing apparatus A and setup apparatuses B, C and D which are connected on-line with the image processing apparatus A.

The setup apparatus B comprises an image input section 7 having a linear light source 10, mirrors 11 (three in this embodiment), a lens 12 and a CCD 13, an A/D converter 14, a shading compensating circuit 15, an image processing circuit 16, a CRT driver 17, a CRT 18, a setup condition input section 19 and a computing control section 20.

The setup apparatus B having the above construction is operated in the following way.

A document holder 1 retaining a document is illuminated by a light from the linear light source 10, and an image of the document is read out as an image signal by a CCD 13 through the mirrors 11 and the lens 12. The image signal is converted into a digital signal by the A/D converter 14. The shading compensating circuit 15 compensates a light intensity unevenness of the linear light source 10 and a sensitivity unevenness of the CCD 13. Then, the obtained image is processed by an image processing circuit 16, or more specifically, tones are adjusted and contrast is emphasized. In accordance with the signal obtained by the processing, the CRT driver 17 drives the CRT 18, whereby the image is displayed on the CRT 18.

The setup condition input section 19 comprises digitizers for inputting portions to be trimmed and masked and points of highlight and shadow, and also various switches for determining setup conditions. The setup conditions include a degree and a type of tone adjustment and contrast emphasis for the shadowed, half-tone and highlighted portions.

The computing control section 20 comprises a CPU 21, a ROM 22 for storing a control program, a RAM 23 for storing data from the setup condition input section 19, and an I/O interface 24 for transferring control signals between the CPU 21 and the other members of the setup apparatus B.

Figure 2:
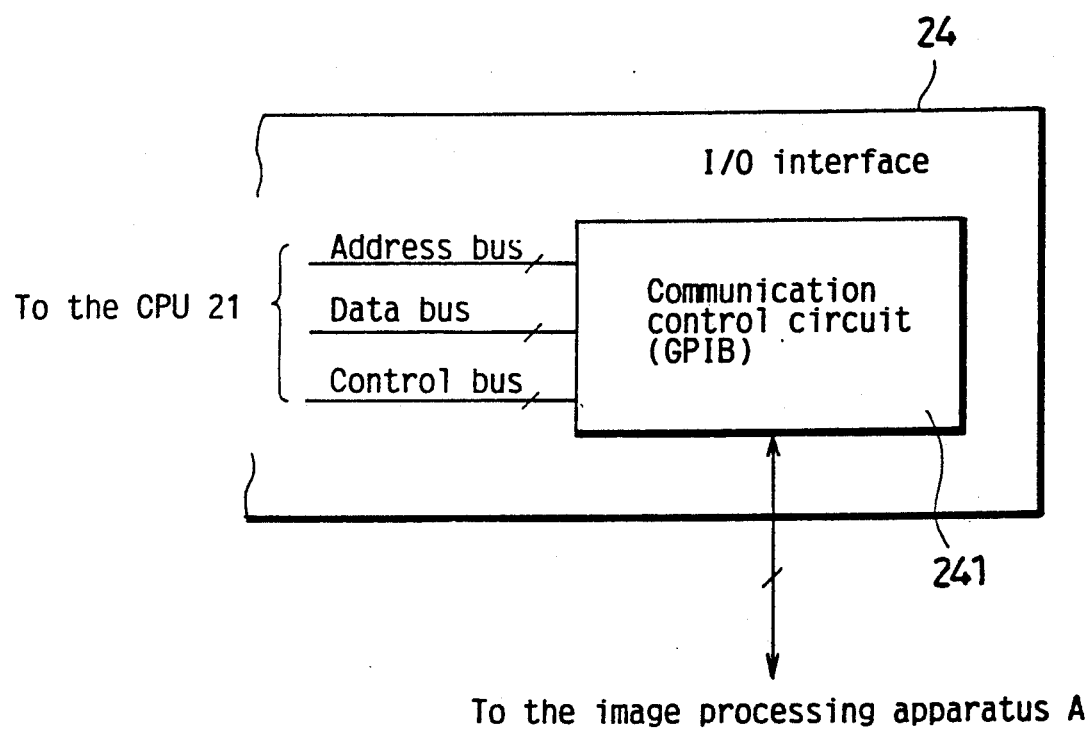
FIG. 2 is a block diagram showing details of a portion of an I/O interface included in a setup apparatus.

As shown in FIG. 2, the I/O interface 24 is equipped with a communication control circuit 241 for transferring the setup conditions to the image processing apparatus A. The communication control circuit 241 is conformed to, for example, GPIB interface standards. The circuit 241 is connected to the CPU 21 through an address bus, a data bus and a control bus.

Figure 3:
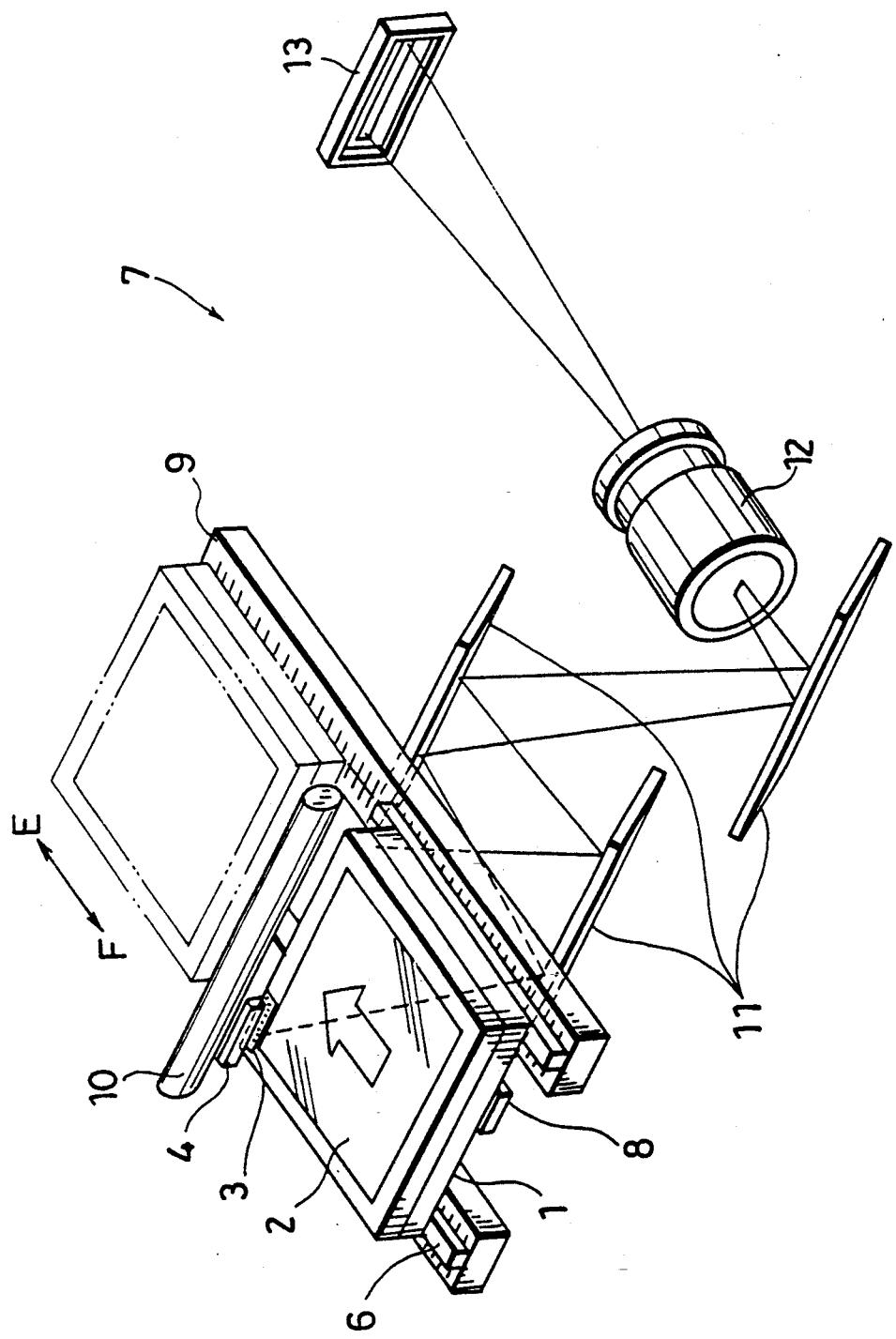
FIG. 3 is a perspective view of an image input section.

The image input section 7 has a construction shown in FIG. 3 and is operated in the following way in detail.

The document holder 1 comprising two sheets of glass holding the document 2 therebetween is set on a document holder base 6. A scanning start switch (not shown) is turned on while the holder 1 is detected by a holder sensor 8, whereby a scanning is started.

If the document holder 1 is set, a linear motor 9 is driven to move the document holder 1 in a direction of E at a specified fixed speed. The document holder 1 has a holder identification data setting section 3. When the section 3 reaches a position corresponding to an identifying sensor 4, the document holder 1 is stopped and an identification data of the section 3 is detected by the sensor 4.

Figure 4:
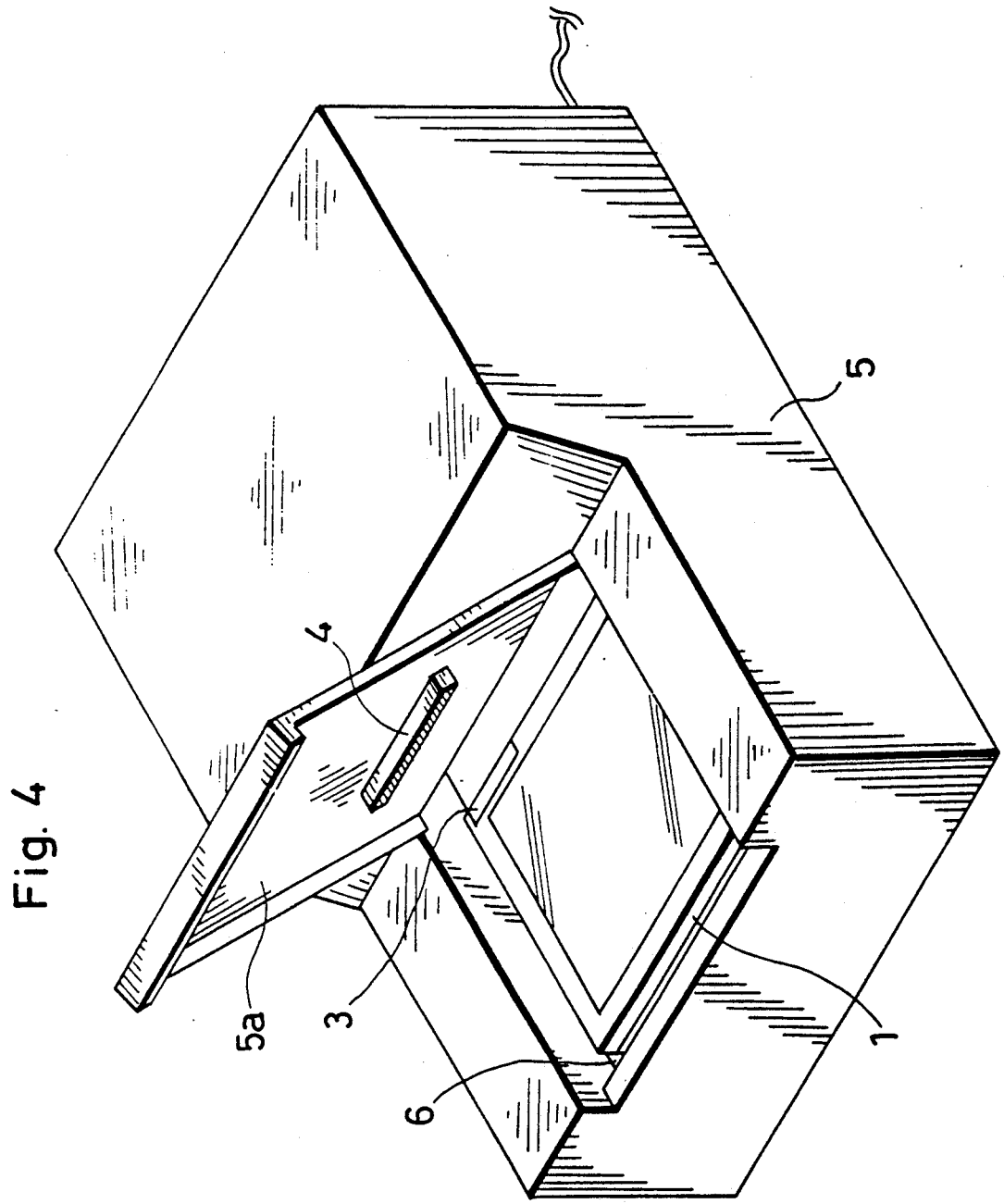
FIG. 4 is a perspective view showing position of an identifying sensor.

As shown in FIG. 4, the sensor 4 is fixed on an inside surface of a cover 5a covering the document holder base 6. The cover 5a is also a portion of a casing 5 which accommodates the document holder 1, the linear motor 9 and so on.

Figure 5:
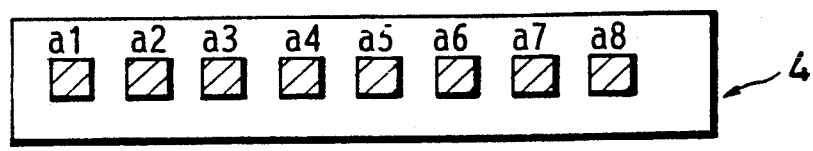
FIG. 5 is a front view of the identifying sensor.
Figure 6:
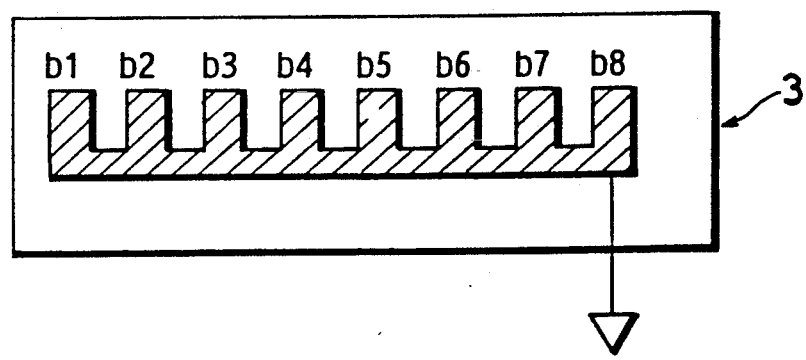
FIG. 6 is a front view of an identification data setting section.
Figure 7:
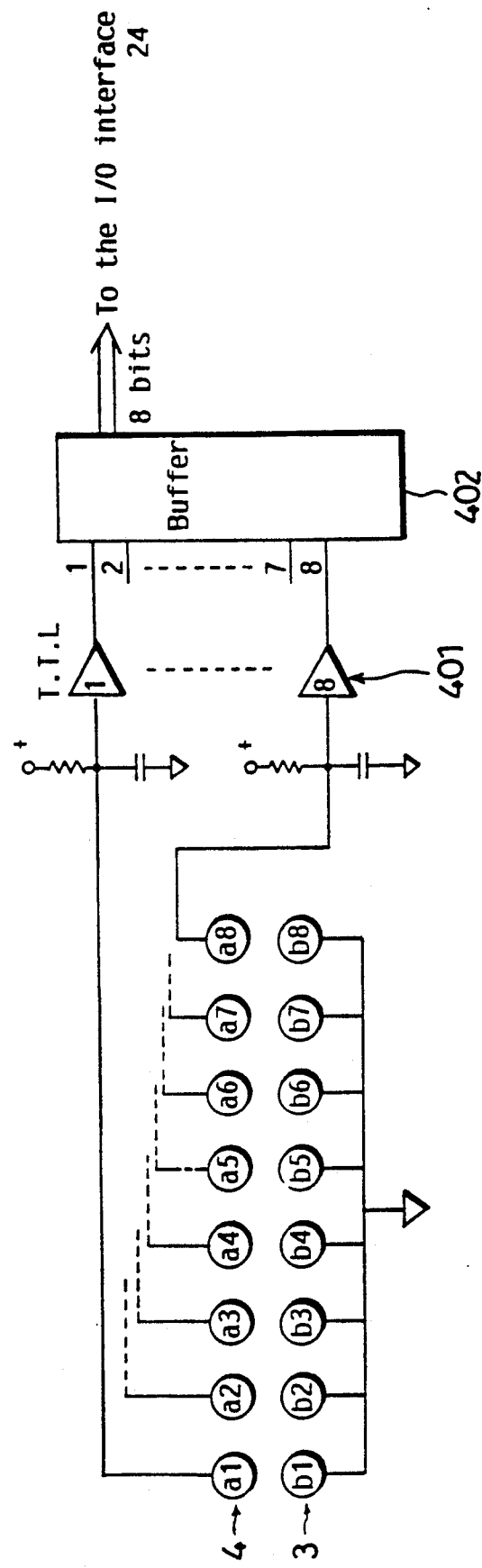
FIG. 7 is a circuit diagram showing a detection circuit of the identifying sensor.

The identifying sensor 4 has, for example, eight detectors a1 through a8 as shown in FIG. 5. The identification data setting section 3 has a grounded conductor having eight convex portions b1 through b8 to be detected (FIG. 6). At least one of the convex portions b1 through b8 may be missing. A circuit shown in FIG. 7 having a Schmitt trigger 401a and a buffer 402 detects whether any convex portion is missing and if so which convex portion or portions are missing. In this way, an identification data of the document holder 1 is obtained. The identification data of the document holder 1 is available in 256 ($2^8$) types.

When the identification data is obtained, the linear light source 10 comprising a halogen lamp or a fluorescent lamp (FIG. 3) is lighted and the linear motor 9 is driven again to move the document holder 1 in the E direction at a specified fixed speed. While the document holder 1 is moving, the document 2 is slit-exposed and read out by the CCD 13 through the mirrors 11 and the lens 12 with a resolution which is lower than that of a CCD 43 of the image processing apparatus A.

When an encoder (not shown) attached to the linear motor 9 detects that the above slit exposure is completed, the linear light source 10 is turned off and the linear motor 9 is driven in the opposite direction to move the document holder 1 in an direction of F back to the original position.

In this way, the image is read out and displayed on the CRT 18.

If the operator judges that the present setup 10 conditions are appropriate with reference to the image on the CRT 18 and turns on a setup completion key of the setup condition input section 19, the setup conditions and the identification data of the document holder 1 are stored in the RAM 23.

Figure 8:
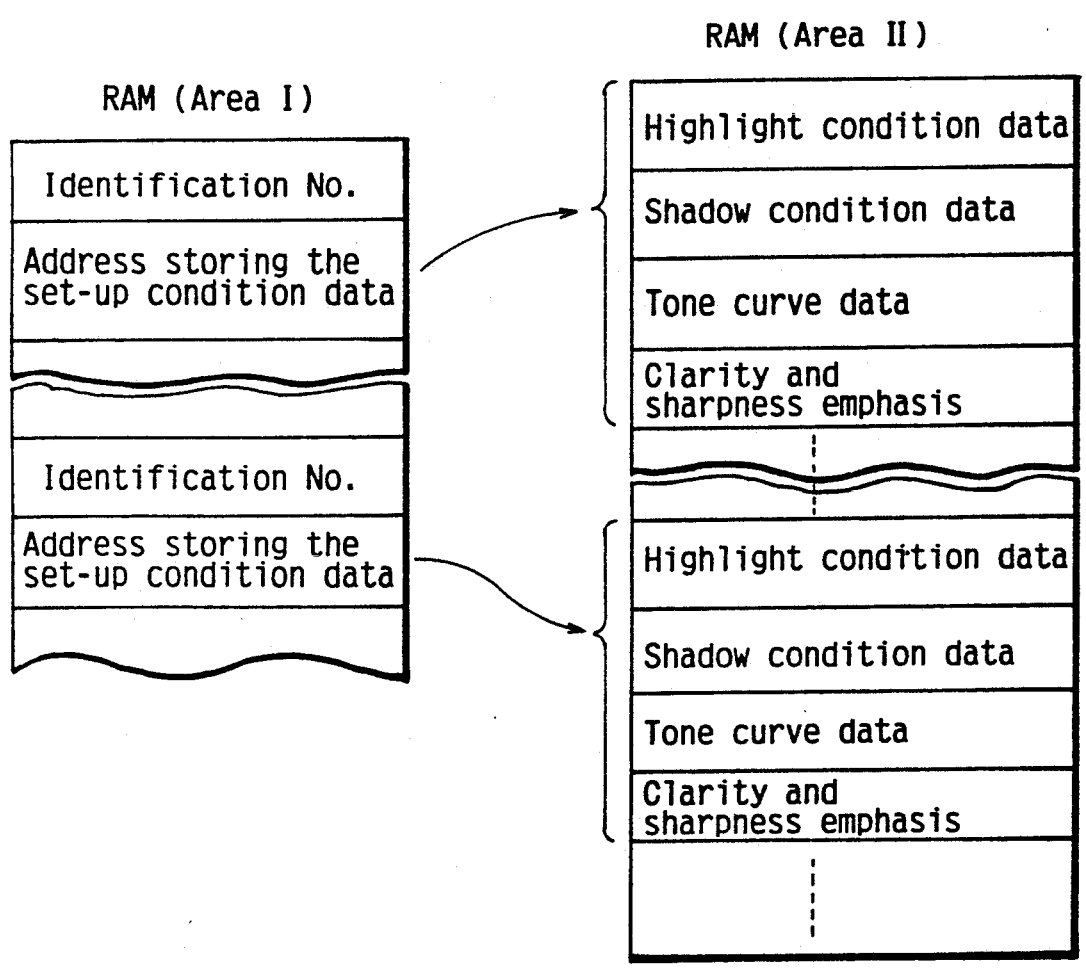
FIG. 8 is a view showing a storage structure of a RAM included in an image processing apparatus or in the setup apparatus.

As shown in FIG. 8, the RAM 23 has areas I and II. The area I holds the identification data of the document holder 1 in association with another data indicating which address holds the setup conditions of the holder 1. The area II corresponding to the above area I holds data indicating the setup conditions. In this construction, the setup conditions can be stored at any desired area of the RAM 23. The setup conditions may be stored in the area which is reserved in advance in association with the identification data, in which case, the area I is not necessary.

The data stored in the RAM 23 is sent to the image processing apparatus A thereafter.

The setup apparatuses C and D each have the identical construction with the apparatus B. When the setup conditions are determined, the setup conditions and the identification data of the document holder 1 are stored in specified areas of RAMs 30 and 31 of the apparatuses C and D and then sent to the image processing apparatus A.

After received by the apparatus A, the setup conditions and the identification data are stored in a RAM 55 thereof.

The image processing apparatus A comprises an image input section 37 having a linear light source 40, mirrors 41 (three in this embodiment), a lens 42 and a CCD 43, an A/D converter 44, a shading compensating circuit 45, an image processing circuit 46, a dot generator 47, an acoustic optical modulator (AOM) 48, a laser 49, a galvanometer mirror 50, a condition input section 51, and a computing control section 52 having a CPU 53, a ROM 54, a RAM 55 and an I/O interface 56.

As shown in FIG. 9, the I/O interface 56 is equipped with a communication control circuit 561 for receiving the setup conditions from the setup apparatuses B, C and D. The circuit 561 is connected to the CPU 53 through an address bus, a data bus and a control bus. The control bus includes an interrupt signal for carrying out an interruption so that the I/O interface may receive the data to be transferred to the CPU 53 when a data transfer starting signal is outputted from the setup apparatus B, C or D (will be described later).

The image input section 37, the A/D converter 44, a shading compensating circuit 45, and the image processing circuit 46 are operated in the same way as their counterparts of the setup apparatus B. The document holder 1 whose setup conditions are determined is set on the document holder base 6 of the image processing apparatus A. When a scanning is started, the identification data of the document holder 1 is read out by an identification sensor 64 and the setup conditions associated with to the data is read out from the RAM 55. The RAM 55 also have areas I and II.

When the setup conditions are read out from the RAM 55, the image processing apparatus A processes the image based on the setup conditions. In accordance with the obtained image processing data, the dot generator 47 generates a dot pattern, and the AOM 48 modulates the light of the laser 49. A photosensitive film 57 is exposed through the galvanometer mirror 50.

FIG. 10 is a flowchart of controlling the setup apparatuses B, C and D. When it is detected by the holder sensor 8 that the document holder 1 is newly set (Step n1) and the scanning start switch (not shown) is turned on (Step n2), the identification data of the document holder 1 is read out by the identification sensor 4 (Step n3). The image data is read out by the CCD 13 (Step n4), the image processing is done based on the standard setup conditions which have been set in advance (Step n5), and the obtained image data is displayed in the CRT 18 (Step n6).

If the operator instructs an alteration of the setup conditions with reference to the image displayed on the CRT 18 (Step n7), the operation goes to Step 12, where desirable setup conditions are inputted by the setup condition input section 19 and the image processing is done based on the newly inputted conditions (Step n5) and the processed image is displayed on the CRT 18 (Step n6).

When the operator instructs the completion of the setup condition alteration (when the setup completion key is operated), the operation goes to Step n8, where the identification data and the setup conditions of the document holder 1 are stored in the areas I and II of the RAMs 23, 30 and 31. Then, the data transfer starting signal is sent to the image processing apparatus A (Step n9). If the apparatus B receives a data transfer enable signal from the apparatus A (Step n10), the operation goes to Step n11, where the identification data and the setup conditions are sent to the image processing apparatus A.

If a data transfer unable signal is sent from the image processing apparatus A on the grounds, for example, that the image processing apparatus A is exchanging data with another setup apparatus in Step n10, the operation goes to Step n13 to wait for a specified period of time. Thereafter, the data transfer starting signal is again sent to the image processing apparatus A (Step n9).

In the case wherein the operation waits until the data transfer is enabled, the areas I and II of the RAMs 23, 30 and 31 may each have a capacity of storing one setup condition. If the above RAMs each have a capacity of storing a plurality of setup conditions, the data processing may be temporarily stopped if the data transfer is not possible. In such a case, after the system is ready for determining the setup conditions of the next document, it is checked whether or not the data transfer is possible, and if possible, the data is transferred to the image processing apparatus A.

Figure 11A:
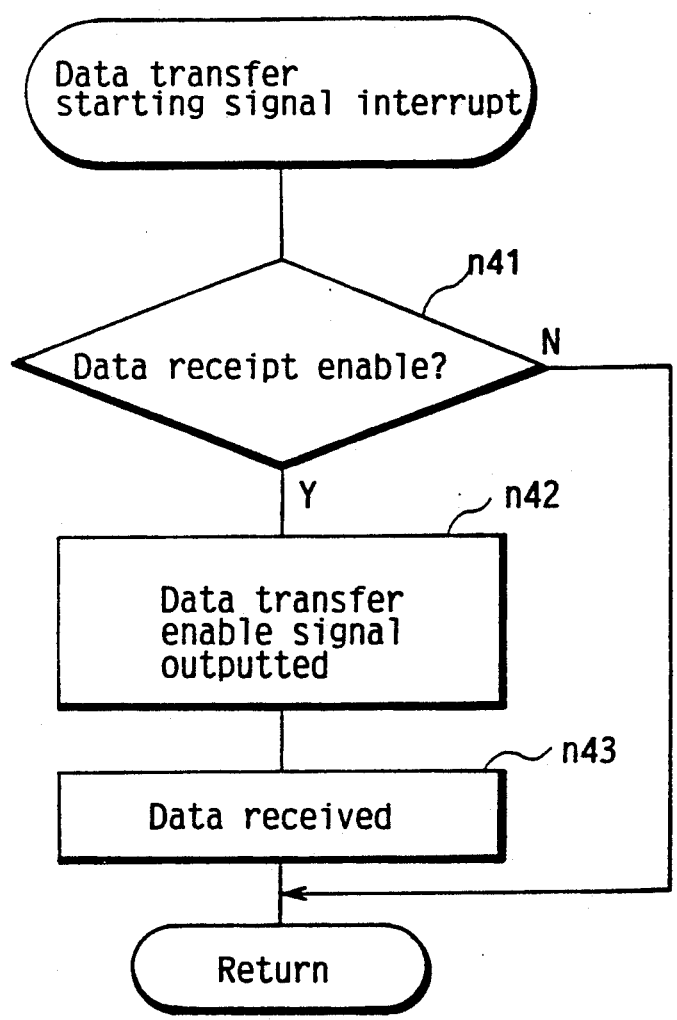
FIG. 11(a) is a flowchart of an interrupt routine followed by the image processing apparatus in the image processing system shown in FIG. 1.

FIG. 11a shows the flowchart of an interrupt processing routine performed when the data transfer starting signal mentioned above is received in the image processing apparatus A.

At first, it is determined whether data reception is possible (Step n41). If not possible, the operation return to a main routine mentioned below (the data transfer starting signal is disabled).

If possible, the data transfer enable signal are output to the setup apparatuses B, C or D from which the data transfer starting signal are output (Step n42), and the data transferred from the setup apparatuses B, C or D is received as mentioned above (Step n43), and the process returns to the main routine.

Figure 11B:
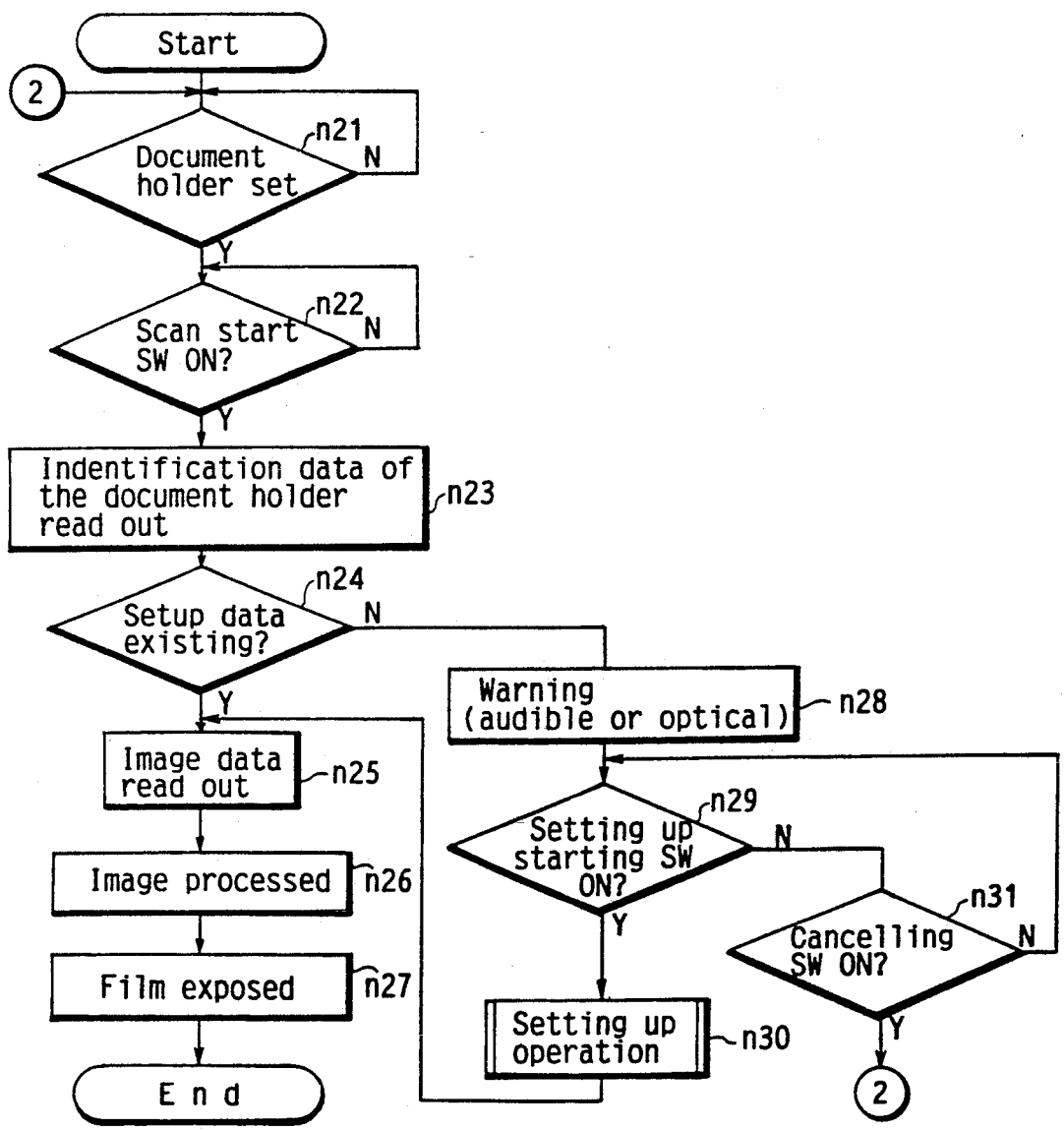
FIG. 11(b) is a flowchart of a main operation of the image processing apparatus.

FIG. 11b is a flowchart of a main operation of the image processing apparatus A. When the document holder 1 is detected to be set by the holder sensor 68 (Step n21), a scan starting switch (not shown) is set (Step n22). Then, the identification signal of the document holder 1 is read out by the identification sensor 64 (Step n23). Whether the setup conditions corresponding to the identification data is stored in the RAM 55 of the apparatus A or not is judged (Step n24). If the data is stored, the image is read out in Step n25, thereafter the image processing is carried out based on the setup conditions (Step n26) and the photosensitive film57 is exposed (Step n27).

If the above data is not stored in Step n24, an audible or optical warning is emitted, thereafter a setup starting switch is operated (Step n29), and the same type of setting up with the apparatus B, C or D is done in the apparatus A (Step n30). Then, the operation goes to Step n25. If the setting up is not done in Step n29, a canceling switch is operated in Step n31 and the operation goes back to Step n21. If the canceling switch is not operated in Step n31, the operation goes back to Step n29.

According to the above image processing apparatus A, the three setup apparatuses B, C and D connected to the apparatus A reads out the identification data of the document holder 1. When the setup conditions are determined, the setup conditions are stored in the RAM 55, which is the memory device of the apparatus A, in association with the identification data. When the identification data of the document holder 1 is read out, the apparatus A reads out the relevant setup conditions from the RAM 55 and scans the image based on the setup conditions.

Although the image processing apparatus A reads out the setup conditions determined by the setup apparatuses B, C and D from the RAM 55 in the apparatus A in the above embodiment, the setup conditions read out from the apparatus A may be stored in the RAMs 23, 30 and 31 of the apparatuses B, C and D to be read out when necessary. In such a construction, the apparatus A sends out the identification data to the setup apparatuses B, C and D and demands the transfer of the corresponding setup conditions, and the setup apparatus B, C or D which stores the relevant setup conditions transfers the setup conditions. In this case, the transfer of the identification data is not necessary.

The areas I and II of the apparatus A need not have the same capacity with those of the apparatus B, C and D each. If the system is constructed to transfer the data immediately after the setting up, the apparatus A only may have a large capacity. If the system is constructed to transfer the data on receipt of the demand from the apparatus A, the apparatuses B, C and D only may have a large capacity.

The image processing apparatus A may be connected not only to a plurality of the setup apparatuses like this embodiment but also to a single setup apparatus, and to any number of the setup apparatuses.

A plurality of the image processing apparatuses and a plurality of the setup apparatuses may be connected each other.

Embodiment 2

A second embodiment of the invention will be described hereinafter, in which like components are labeled with like reference numerals with respect to the first embodiment, and the description of these components is not repeated.

Figure 12:
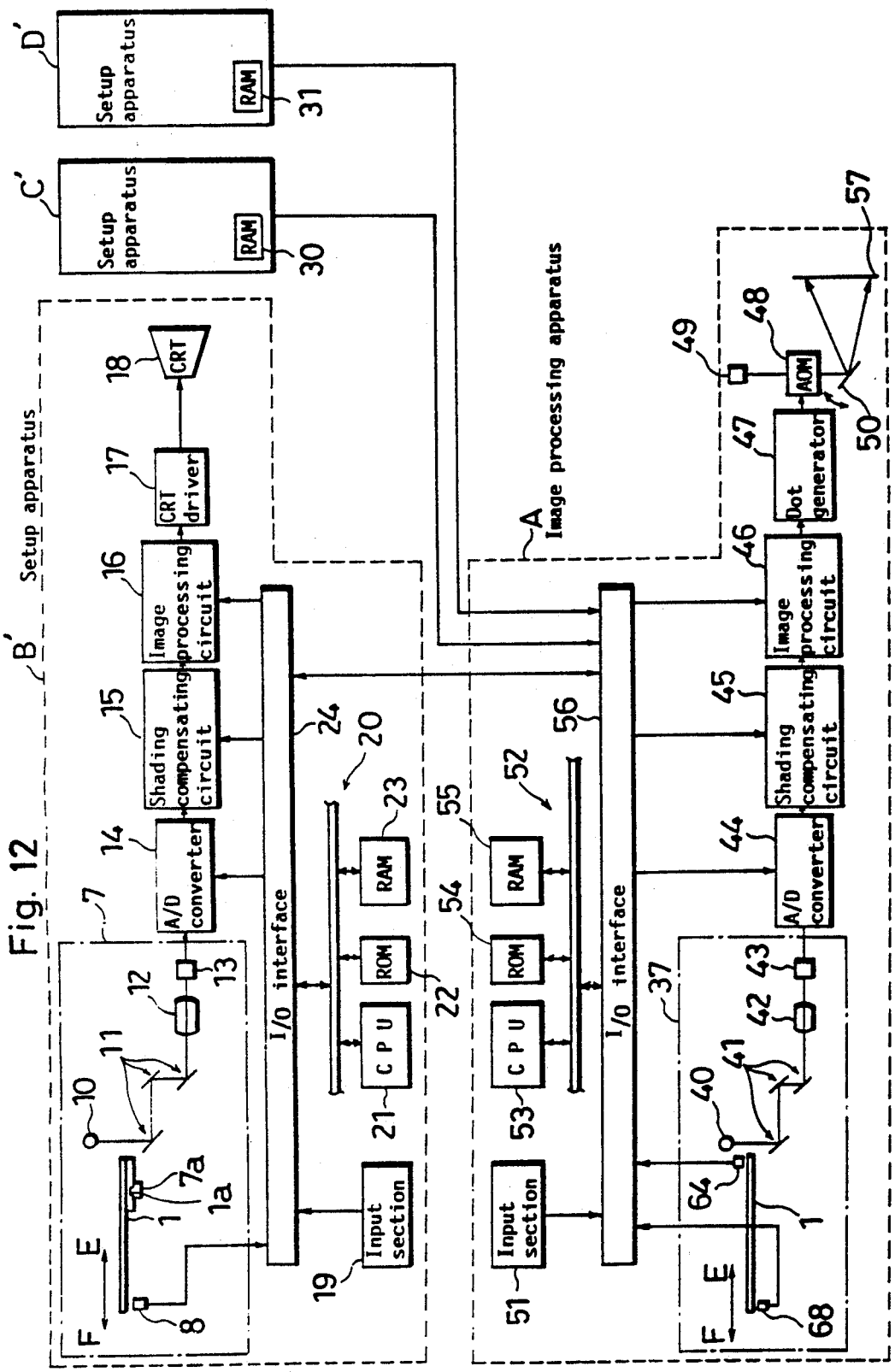
FIG. 12 is a block diagram of a second embodiment of this invention.

FIG. 12 is a block diagram showing the second embodiment. This embodiment is the same as the first embodiment as far as the hardware features of the image processing apparatus A are concerned. The differences reside in parts of the setup apparatuses, and in that the first embodiment includes the holder identification data setting section 3 for identifying the document holder 1 whereas the second embodiment includes a setup apparatus identification data setting section 3' for identifying a setup apparatus B', C' or D' to which a particular document holder is applicable.

Specifically, each of the setup apparatuses B', C' and D' does not require an identifying sensor for reading the setup apparatus identification data from the document holder 1, but instead includes projections 7a arranged perpendicular to the E-F direction on the document holder base 6. Positions of these projections 7a are varied for the different setup apparatuses. The document holder 1, on the other hand, includes recesses 1a formed on the bottom surface thereof and corresponding in position to the projections 7a. Thus, the document holder 1 can be set to a particular one of the setup apparatuses. After reading the setup apparatus identification data, the image processing apparatus A reads setup conditions from the RAM of the setup apparatus corresponding to the identification data.

Figure 13:
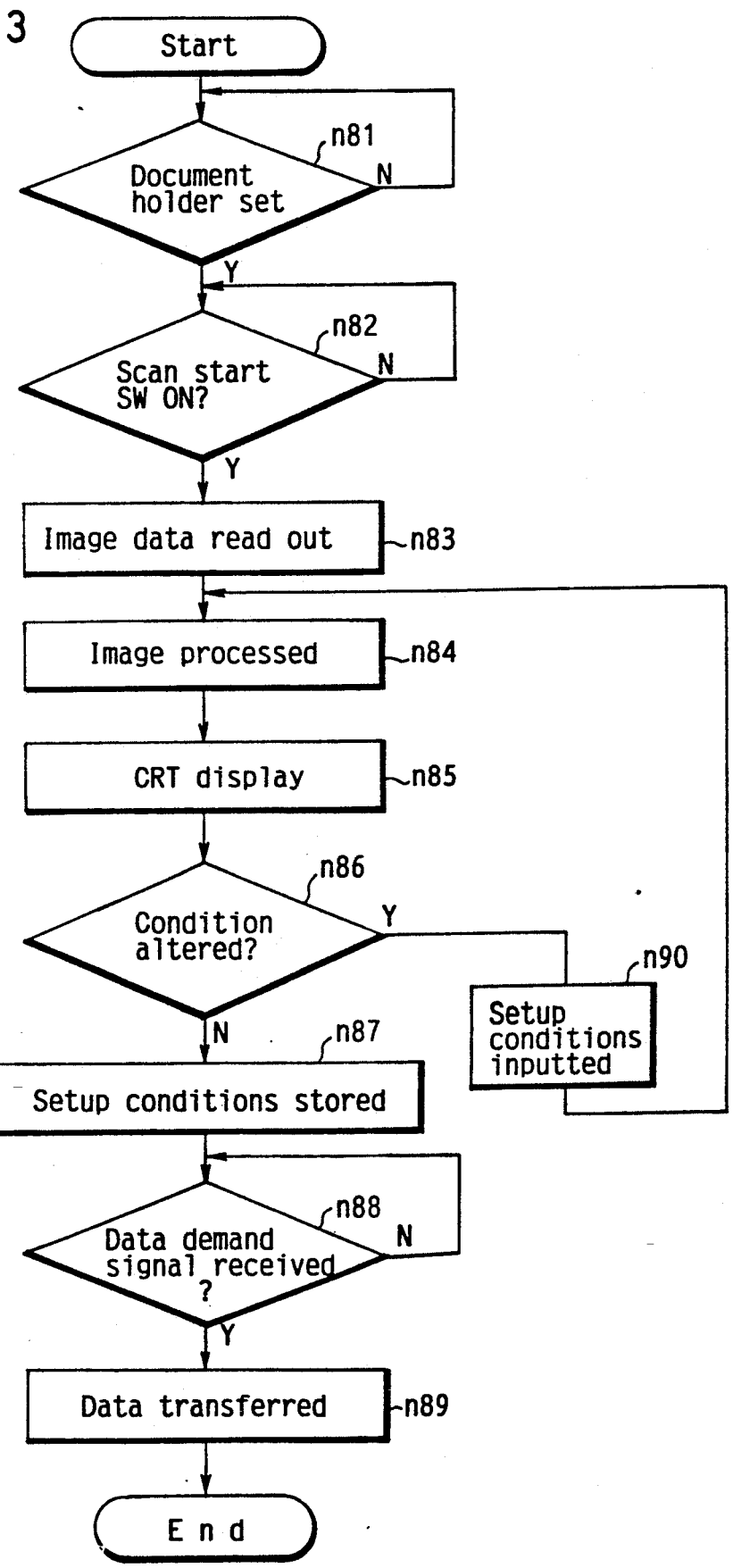
FIG. 13 is a flowchart showing a sequence of controlling a setup apparatus in the second embodiment.
Figure 14:
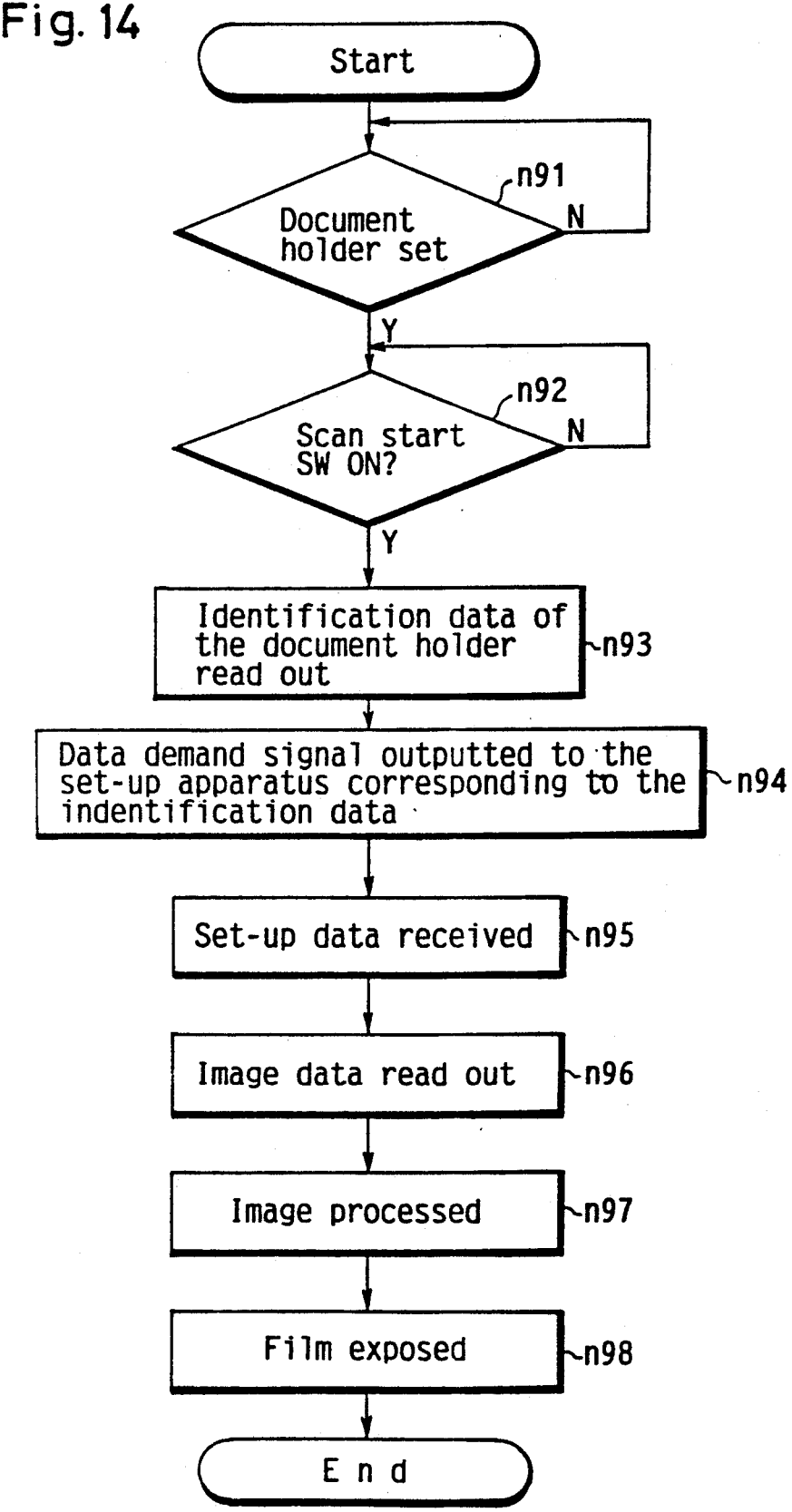
FIG. 14 is a flowchart showing a sequence of controlling an image processing apparatus in the second embodiment.

FIG. 13 is a flowchart showing controls of the setup apparatuses B', C' and D' in this embodiment. When it is detected by the holder sensor 8 that the document holder 1 is newly set (Step n81) and the scanning start switch (not shown) is turned on (Step n82), image data is read by the CCD 13 (Step n83), image processing is done based on the standard setup conditions which have been set in advance (Step n 84), and the processed image data is displayed on the CRT 18 (Step n85).

If the operator instructs an alteration of the setup conditions with reference to the image displayed on the CRT 18 (Step n86), the operation goes to Step n90, where desirable setup conditions are inputted by the setup condition input section 19. The image processing is done based on the newly inputted conditions (Step n84) and the processed image is displayed on the CRT 18 (Step n85).

When the operator operates the setup completion key, the operation goes to Step n87, where the setup conditions are stored in the RAMs 23, 30 and 31. Subsequently, when one of the setup apparatuses receives a data request signal from the image processing apparatus A (Step n88), this setup apparatus transfers the setup conditions to the image processing apparatus A (Step n89).

A control operation for the image processing apparatus A will be described next. When the document holder 1 is detected by the holder sensor 68 (Step n91), and the scan starting switch (not shown) is operated (Step n92), the identification sensor 64 reads the setup apparatus identification data set to the document holder 1 (Step n93). Next, the data request signal is outputted to the setup apparatus corresponding to the setup apparatus identification data (Step n94). When the setup conditions are received subsequently (Step n95), the image processing apparatus A reads the image (Step n96), processes the image on the setup conditions (Step n97) and exposes a photosensitive film 57 (Step n98).

This embodiment is based on the assumption that a plurality of setup apparatuses are connected to the image processing apparatus A. Accordingly, the image processing apparatus reads the original image after outputting the data request signal to the setup apparatus corresponding to the setup apparatus identification data read from the document holder 1 set ready to be scanned.

In this embodiment, the setup conditions are stored only in the setup apparatuses. As in the first embodiment, it is possible to transfer, immediately upon completion of setup, data combining the setup apparatus identification data and setup conditions to the image processing apparatus A where the data are stored in relation to the respective setup apparatuses. In this case, only the setup conditions may be transferred as long as the image processing apparatus A is adapted capable of identifying, by means of apparatus addresses or the like, which of the setup apparatuses has provided the setup conditions. The setup conditions and setup apparatus identification data may be stored in pairs as in the first embodiment, or in areas assigned to the identification data.

In the above embodiment, the document holder 1 includes the recesses 1a besides the setup apparatus identification data setting section 3'. These devices may be integrated in the following two ways:

(1) Where the setup apparatus identification data setting section 3' utilizes varied shapes as described above, the projections 7a of the image input section 7 may be arranged in a corresponding way to be used for that purpose also.

(2) The projections 7a are dispensable by providing an identifying sensor 4 in the image input section 7 as in the first embodiment, instead of providing the setup apparatus identification data setting section 3' on the document holder 1. In this case, an alarm is given when the setup apparatus identification data does not match the identifying sensor B', C' or D', or setup is enabled only in the event of a match.

Figure 15:
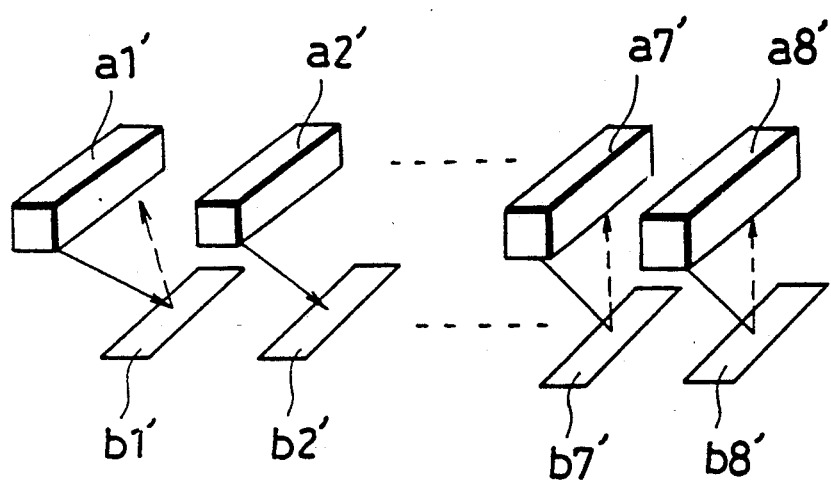
FIG. 15 is a perspective view of a modified identification data setting section and identifying sensors.

In the two embodiments described hereinbefore, the identification data setting section 3 or 3' employs the conductor pattern shown in FIG. 5. This construction is variable. As shown in FIG. 15, for example, the document holder 1 may include a plurality of reflecting plates b1'-b8' in a selected arrangement for detection by reflection type optical detectors a1'-a8' and detecting circuits (as shown in FIG. 16) included in the image processing apparatus A and setup apparatuses B, C and D or B', C' and D'. Further, the setup apparatus identification data setting section 3' may employ a black and white pattern, a corrugated pattern or a bar code. The identifying sensor may employ a reflection type photosensor array or a microswitch array capable of reading such a pattern. It is also possible to use a photo-interrupter type sensor, or a combination of magnets and lead switches or magnetic sensors.

This invention is not limited to the GPIB interface for use in transferring the setup conditions and other data between the setup apparatuses B, C and D and image processing apparatus A. Various interfaces may be used, which include an RS-232C interface or an interface specially devised for this purpose. However, a bus type interface such as the GPIB interface provides for flexibility with respect to the number of setup apparatuses connected to the image processing apparatus A, hence an advantage in terms of system extension.

Various transfer protocols may be used, such as those for effecting poling or handshakes in interrupt processes or with predetermined timing.

The data transfer start signal and data transfer enable signal may be transmitted through a signal line dedicated thereto or by transfer of commands through a data line.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing system for reading and processing an original image, comprising:
    a plurality of document holders each for supporting an original document and having identification data;
    a setup apparatus for reading the identification data and determining setup conditions relating to said original document;
    an image processing apparatus for reading the identification data from one of said plurality of document holders, and reading and processing the original image of the original document supported by one of said plurality of document holders; and
    a communication line, connecting said setup apparatus and said image processing apparatus, for transferring the identification data read by said setup apparatus and the setup conditions determined by said setup apparatus to said image processing apparatus,
    wherein said image processing apparatus is set with the setup conditions corresponding to the identification data read by said image processing apparatus to read and process the original image of the original document supported by said one of said plurality of document holders based on said setup conditions.

2. An image processing system as defined in claim 1, wherein said identification data is a data for discriminating the document holder to which said identification data is applied, from the other document holders.

3. An image processing system as defined in claim 2, wherein said setup apparatus includes a first memory for storing the setup conditions in relation to the identification data.

4. An image processing system as defined in claim 3, wherein said first memory stores said identification data in addition to said setup conditions as an integral part thereof.

5. An image processing system as defined in claim 4, wherein said setup apparatus stores the determined setup conditions in corresponding relations with said identification data in said first memory and transmits said setup conditions from said first memory when said image processing apparatus makes a transmit request indicating said identification data, and said image processing apparatus transmits to said setup apparatus the identification data of one of said plurality of document holders when reading and processing the original image, requesting transmission of said setup conditions from said setup apparatus.

6. An image processing system as defined in claim 2, wherein said image processing apparatus includes a second memory for storing the setup conditions, in relation to the identification data, transferred from said setup apparatus through said communication line.

7. An image processing system as defined in claim 6, wherein said second memory stores said identification data in addition to said setup conditions as an integral party thereof.

8. An image processing system as defined in claim 6, wherein said setup apparatus transmits said setup conditions and said identification data after said setup conditions are determined, and said image processing apparatus receives said setup conditions and said identification data transmitted from said setup apparatus and store said setup conditions in corresponding relations with said identification data in said second memory regardless of the image processing.

9. An image processing system for reading and processing an original image, comprising:
    a plurality of document holders each for supporting an original document and having an identification data for discrimination from the other holders;
    a setup apparatus for determining setup conditions relating to the original document, and including read means for reading the identification data from said document holders;
    an image processing apparatus for reading the identification data from one of said plurality of document holders, and reading and processing the original image of the original document supported by said one of said plurality of document holders; and
    a communication line, connecting said setup apparatus and said image processing apparatus, for transferring the identification data read by said image processing apparatus to said setup apparatus and the setup conditions determined by said setup apparatus of said image processing apparatus,
    wherein said setup apparatus transfers the setup conditions corresponding to the identification data transferred from said image processing apparatus, and said image processing apparatus is set with the setup conditions transferred to read and process the original image based on said setup conditions.

10. An image processing system as defined in claim 9, wherein said setup apparatus includes a first memory for storing the setup conditions in relation to the identification data.

11. An image processing system as defined in claim 10, wherein said setup apparatus stores the determined setup conditions in corresponding relations with said identification data in said first memory and to transmit said setup conditions from said memory when said image processing apparatus makes a transmit request indicating said identification data, and said image processing apparatus transmits to said setup apparatus the identification data of one of said plurality of document holders when reading and processing the original image, requesting transmission of said setup conditions from said setup apparatus.

12. An image processing system as defined in claim 9, wherein said image processing apparatus includes a second memory for storing the setup conditions, in relation to the identification data, transferred from said setup apparatus.

13. An image processing system as defined in claim 11, wherein said setup apparatus transmits said setup conditions and said identification data when said setup conditions are determined, and said image processing apparatus receives said setup conditions and said identification data transmitted from said setup apparatus and store said setup conditions in corresponding relations with said identification data in said second memory regardless of the image processing.

14. An image processing system for reading and processing an original image, comprising:
- a plurality of document holders each for supporting an original document and having setup apparatus identification data;
- a plurality of setup apparatuses each for determining setup conditions relating to said original documents;
- an image processing apparatus for reading the identification data from one of said plurality of document holders, and reading and processing the original image of the original document supported by said one of said plurality of document holders; and
- a communication line, interconnecting each of said setup apparatuses to said image processing apparatus, for transferring the setup conditions determined by said setup apparatuses to said image processing apparatus,
wherein said image processing apparatus is set with the setup conditions determined by said setup apparatus corresponding to the identification data read by said image processing apparatus to read and process the original image based on said setup conditions.

15. An image processing system as defined in claim 14, wherein said document holders and said setup apparatuses are in corresponding relations, respectively.

16. An image processing system as defined in claim 15, wherein said setup apparatus includes a first memory for storing the setup conditions.

17. An image processing system as defined in claim 16, wherein said setup apparatus stores the determined setup conditions in corresponding relations with said identification data in said first memory and transmits said setup conditions from said first memory when said image processing apparatus makes a transmit request indicating said identification data, and said image processing apparatus transmits to said setup apparatus the identification data of a document holder when reading and processing the original image, requesting transmission of said setup conditions from said setup apparatus.

18. An image processing system as defined in claim 15, wherein said image processing apparatus includes a second memory for storing the setup conditions, transferred from said setup apparatus, in relation to the setup apparatus transferred from.

19. An image processing system as defined in claim 17, wherein said setup apparatus transmits said setup conditions and said identification data when said setup conditions are determined, and said image processing apparatus receives said setup conditions and said identification data transmitted from said setup apparatus and stores said setup conditions in corresponding relations with said identification data in sad second memory regardless of the image processing.

20. An image processing method for use with an image processing system having a plurality of document holders each for supporting an original document and having identification data for discrimination from the other holders, a setup apparatus for reading the identification data and determining setup conditions relating to the original documents, an image processing apparatus for reading the identification data from one of said plurality of document holders and processing the original image on determined setup conditions, and a communication line for transferring the setup conditions determined by said setup apparatus to said image processing apparatus, said method comprising the steps of:
- setting one of said document holders to said setup apparatus to determine the setup conditions;
- outputting the setup conditions determined to said communication line as related to said identification data and said setup condition;
- setting said one of said document holders to said image processing apparatus to read the identification data therefrom;
- setting to said image processing apparatus the setup conditions transferred through said communication line corresponding to said identification data read by said image processing apparatus; and
- causing said image processing apparatus to read an original image from the document holder set thereto and to process said image on the setup conditions also set thereto.

21. An image processing method as defined in claim 20, wherein said setup apparatus includes a first memory for storing the setup conditions, and the step of outputting the setup conditions is executed when said image processing apparatus makes a request to transmit the setup conditions corresponding to a particular identification data.

22. An image processing method as defined in claim 20, wherein said image processing apparatus includes a second memory for storing the setup conditions, and the step of outputting the setup conditions is executed promptly after the setup conditions are determined.

23. An image processing method for use with an image processing system having a plurality of document holders each for supporting an original document and having setup apparatus identification data, a plurality of setup apparatuses for determining setup conditions relating to the original documents, an image processing apparatus for reading the identification data from one of said plurality of document holders, and processing the original image on determined setup conditions, and a communication line interconnecting each of said setup apparatuses and said image processing apparatus for transferring the setup conditions determined by said setup apparatuses to said image processing apparatus, said method comprising the steps of:
- setting one of said document holders to one of said setup apparatuses to determine the setup conditions;

outputting the setup conditions determined to said communication line as related to said one of the setup apparatuses;

setting said one of said document holders to said image processing apparatus to read the identification data therefrom;

setting to said image processing apparatus the setup conditions transmitted through the communication line from said one of the setup apparatuses identified by the identification data read; and causing said image processing apparatus to rad an original image from the document holder set thereto and to process said image on the setup conditions also set thereto.

24. An image processing method as defined in claim 23, wherein said setup apparatus includes a first memory for storing the setup conditions, and the step of outputting the setup conditions is executed when said image processing apparatus makes a request to transmit the setup conditions corresponding to a particular identification data.

25. An image processing method as defined in claim 23, wherein said image processing apparatus includes a second memory for storing the setup conditions, and the step of outputting the setup conditions is executed promptly after the setup conditions are determined.

* * * * *